United States Patent
Hazra et al.

(10) Patent No.: US 8,566,610 B2
(45) Date of Patent: Oct. 22, 2013

(54) METHODS AND APPARATUS FOR RESTORATION OF AN ANTI-THEFT PLATFORM

(75) Inventors: Mousumi Hazra, Beaverton, OR (US);
Gyan Prakash, Beaverton, OR (US);
Saurabh Dadu, Tigard, OR (US);
Mojtaba Mirashrafi, Portland, OR (US); Duncan Glendinning, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 12/653,872

(22) Filed: Dec. 18, 2009

(65) Prior Publication Data

US 2011/0154030 A1    Jun. 23, 2011

(51) Int. Cl.
*G06F 11/30* (2006.01)

(52) U.S. Cl.
USPC ............. 713/189; 713/150; 713/187; 380/28; 380/29; 380/30; 380/44; 380/46; 726/34; 726/35; 455/410; 455/411

(58) Field of Classification Search
USPC ........................................................ 713/164
See application file for complete search history.

(56) References Cited

U.S. PATENT DOCUMENTS

| | | | |
|---|---|---|---|
| 6,370,649 B1 | 4/2002 | Angelo et al. | |
| 6,633,981 B1* | 10/2003 | Davis | 713/189 |
| 2003/0159054 A1* | 8/2003 | Fauble et al. | 713/189 |
| 2004/0187024 A1* | 9/2004 | Briscoe et al. | 713/201 |
| 2005/0044404 A1 | 2/2005 | Bhansali et al. | |
| 2006/0206720 A1 | 9/2006 | Harada et al. | |
| 2008/0130893 A1* | 6/2008 | Ibrahim et al. | 380/277 |
| 2008/0134299 A1 | 6/2008 | Posamentier | |
| 2008/0167002 A1 | 7/2008 | Kim et al. | |
| 2008/0215868 A1* | 9/2008 | Lee et al. | 713/1 |
| 2008/0320312 A1* | 12/2008 | Duffus et al. | 713/189 |
| 2009/0002162 A1* | 1/2009 | Glendinning | 340/571 |
| 2009/0013393 A1* | 1/2009 | Xi | 726/7 |
| 2009/0089887 A1 | 4/2009 | Aissi et al. | |
| 2009/0248827 A1 | 10/2009 | Hazra et al. | |
| 2010/0037291 A1* | 2/2010 | Tarkhanyan et al. | 726/1 |
| 2010/0162368 A1 | 6/2010 | Aissi et al. | |

FOREIGN PATENT DOCUMENTS

| | | |
|---|---|---|
| JP | 2005-071219 A | 3/2005 |
| JP | 2006-251857 A | 9/2006 |
| WO | 2009081501 A1 | 7/2009 |

OTHER PUBLICATIONS

Gyan G. Prakash et al, U.S. Appl. No. 12/592,605, filed Nov. 30, 2009 entitled "Automated Modular and Secure Boot Firmware Update".
Office Action received for Korean Patent Application No. 10-2010-129805 mailed on Apr. 20, 2012, 3 pages of Office Action and 2 pages of English Translation.

(Continued)

*Primary Examiner* — Christopher Brown
*Assistant Examiner* — Canh Le
(74) *Attorney, Agent, or Firm* — Barnes & Thornburg LLP

(57) ABSTRACT

Embodiments of methods for restoration an anti-theft platform are generally described herein. Other embodiments may be described and claimed.

15 Claims, 6 Drawing Sheets

(56) References Cited

OTHER PUBLICATIONS

Search Report received for European Patent Application No. 10251870.1, mailed Nov. 7, 2012, 3 pages.
Official Communication received for European Patent Application No. 10251870.1, mailed Nov. 26, 2012, 10 pages.
Korean Office Action for Application No. 10-2010-129805, dated Nov. 30, 2012, 5 pages including 2 pages unofficial English translation.
Office Action received for Japanese Patent Application No. 2010-281684, mailed Jan. 8, 2013, 4 pages of Japanese Office Action and 3 pages of unofficial English translation.

* cited by examiner

METHODS AND APPARATUS FOR RESTORATION OF AN ANTI-THEFT PLATFORM

TECHNICAL FIELD

The present disclosure relates generally to the field of anti-theft protection of electronic devices, and more particularly to methods and related apparatus for accessing a platform configured with an anti-theft (AT) system or mechanism for reconfigurations, repairing and re-setting of Anti-Theft Firmware.

BACKGROUND

Electronic devices are becoming more and more ubiquitous and mobile, and with user-data becoming more distributed among laptops, desktops, servers, and handhelds, the theft of electronic devices, from desktops to mobile devices, has also increased. Anti-theft protection is a tool that may be used to prevent access of the user-data and may be employed in the electronic device through some combination of software, hardware, and firmware. Application of the anti-theft system, when triggered, can initiate one or more processes such as disabling of the electronic device and deletion of data from the electronic device. An authentication process may be used to allow repair of the electronic device or platform and access to the user-data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
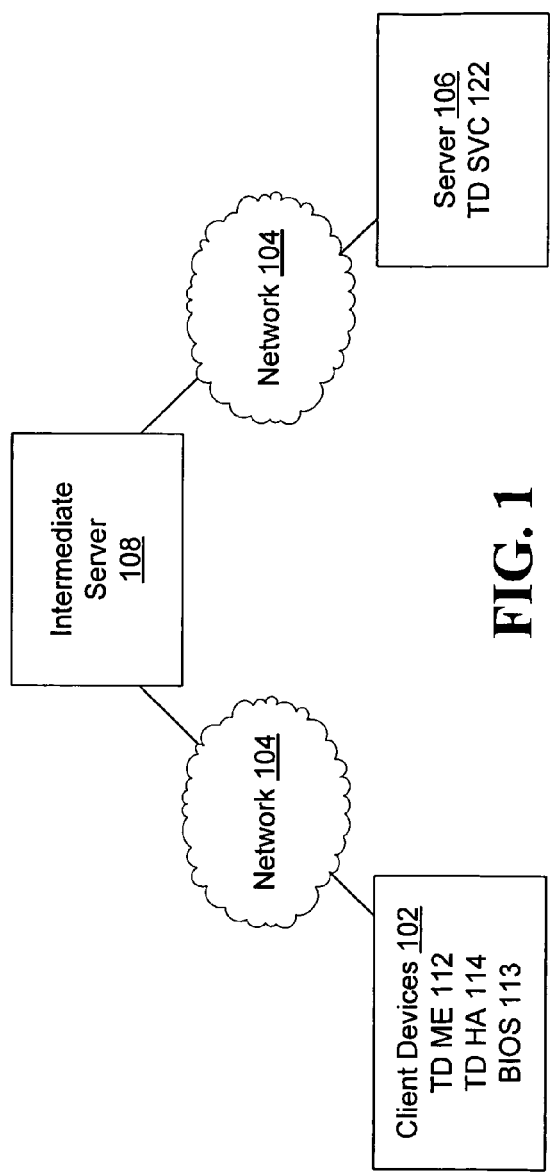
FIG. 1 is a block diagram overview of various embodiments of the disclosure.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for secure and reliable recovery of a platform are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide a way to access a platform with an anti-theft (AT) system, such as for repair or recovery of the platform wherein the AT system has been activated on the platform. In some scenarios, it can be difficult for an authorized user to analyze and detect a cause of failure of a platform in a repair scenario. Recovery of the platform with an AT system activated on the platform typically requires that an authorized user re-load or reflash an image to the platform.

In an embodiment where a manageability engine (ME) is used on an Intel® chipset-based embedded processor, the AT system may be disabled by reflashing a ME firmware image. The ME firmware image is a reflection of the ME containing the complete contents and structure of the Anti-Theft Firmware component on a data storage mechanism or device. Reflashing of the ME firmware image may cause an independent software vendor (ISV) to lose Anti-Theft configurations data including Anti-Theft client activation status on the platform. Similarly, recovery of the disabled/locked Intel Anti-Theft platform in a case where the ISV is no longer available may require reflashing of the complete ME firmware image, which can be costly, time consuming and also may not be possible to complete without replacing flash storage parts on the platform. It would be useful to provide apparatus and methods to access a platform with an anti-theft system in a manner that allows an authorized user or repair person to securely access and repair the platform with reduced effort, time, and cost.

One such method for accessing a client device or platform with an anti-theft (AT) mechanism comprises initiating entry into a standby state by sending a platform public key to a server and receiving a server public key, receiving an encrypted and signed AT permit, sending a rendezvous message to the server, receiving an encrypted and signed AT standby transition message from the server, validating the standby transition message, sending an RSA signed acknowledgment to the server, and initiating the standby state.

FIG. 1 illustrates an overview of various embodiments of the disclosure. As illustrated, each client device 102 (also referred to interchangeably as a platform or station) may be provided with a theft-deterrence enabled chipset firmware and/or hardware. In embodiments, the chipset firmware and hardware comprises a theft deterrence manageability engine (TD ME) 112. The client device 102 may also be provided with a theft-deterrence host agent (TD HA) 114. In particular, TD ME 112 and TD HA 114 may be configured to jointly implement a theft-deterrence protocol with a theft-deterrence service (TD SVC) 122 which may be remotely disposed from client device 102, to deter or thwart theft of the client device 102. TD SVC 122 may be implemented on one or more remotely disposed servers 106. An intermediate server 108 may be employed to facilitate message exchanges between client device 102 and server 106. And, intermediate server 108 may be accessible from client device 102 and server 106 via network 104.

Messages containing instructions of actions to deter or thwart theft of client device 102 may be sent from server 106 to client device 102 via intermediate server 108. TD HA 114 may be configured to assist TD ME 112 of client device 102 in the theft-deterrence protocol, including e.g. determining whether network 104 is accessible, querying intermediate server 108 for messages from TD SVC 122, and/or relaying the message to TD ME 112. TD ME 112 may be configured to verify the relayed message from TD HA 114 and instruct client device 102 to perform theft deterrence actions accordingly.

For the illustrated embodiments, TD HA 114 may be configured to operate in a processor operated application execution environment of the client device 102, whereas TD ME 112 may be configured to operate outside the application execution environment. Client device 102, may have one or more processor operated application execution environments, virtual or otherwise.

Further, client device 102 may be any one of a number of processor based devices, including but are not limited to desktop computing devices, portable computing devices (laptops, netbooks, and other handhelds), set-top boxes, and game consoles. Handhelds may include, but are not limited to, personal digital assistants, digital cameras, media players, and mobile phones. Server 106 may be any number of servers, including but are not limited to blade servers. Networks 104 may include one or more private and/or public, wire line based and/or wireless, local and/or wide area networks.

Additionally, for the illustrated embodiments, each client device 102 may include a basic input/output system (BIOS) 113 configured to cooperate with TD ME 112 in implementing the Anti-Theft process on client device 102. The BIOS may comprise a repair-authentication AT module that may be used to recover the client device 102 from AT disable and transitioning the AT Platform into a standby state.

The isolated and secure execution environment of the ME/Anti-Theft service (e.g. an Intel® service) may comprise a variety of different types of partitions, including an entirely separate hardware partition (e.g., utilizing Intel® Corporation's Manageability Engine ("ME"), Active Management Technologies ("AMT"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement ME, AMT and PRL technologies.

Figure 2:
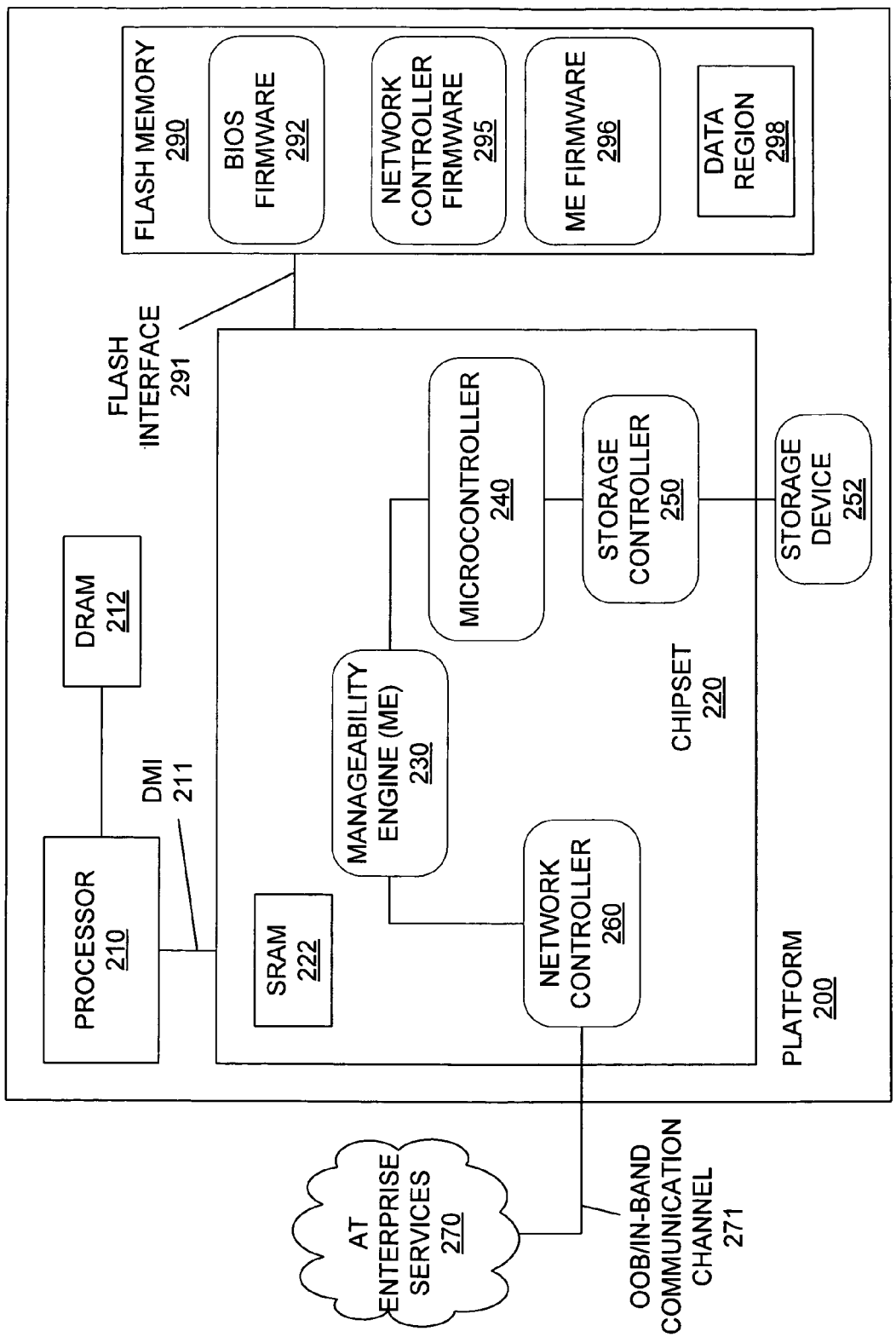
FIG. 2 is a block diagram of a system configured to enable restoration of a platform in accordance with embodiments of the invention.

FIG. 2 is a block diagram depicting a platform in which embodiments of the invention may be implemented. Platform 200, which corresponds to a host computer system, includes a processor 210 connected to a chipset 220 via a desktop management interface (DMI) 211. Processor 210 provides processing power to platform 200 and may be a single-core or multi-core processor, and more than one processor may be included in platform 200. Processor 210 may be connected to other components of platform 200 via one or more system buses, communication pathways or mediums (not shown).

Chipset 220 includes a manageability engine (ME) 230, which may be implemented as an embedded microprocessor that operates independently of host processor 210, to manage the configuration and operation of platform 200. In one embodiment, processor 210 operates under the direction of a host operating system (not shown), whereas manageability engine (ME) 230 provides a secure and isolated environment that cannot be accessed by the host operating system. In one embodiment, manageability engine (ME) 230 authenticates users, controls access to peripheral devices, manages encryption keys for protection of data stored on storage devices of platform 200, and provides an interface to enterprise services 270 via network controller 260. Using enterprise services 270, manageability engine (ME) 230 maintains consistency with enterprise-wide policies for configuration and management of platforms such as platform 200. An Anti-Theft firmware module may be implemented as firmware executed by manageability engine (ME 230).

Communication between ME 230 and enterprise services 270 occurs via out-of-band or in-band (oob/ib) communication channel 271 through an AT Host OS agent for relaying messages between ME and AT Server. In one embodiment, oob/ib communication channel 271 is a secure communication channel between the manageability engine (ME) 230 on the host system and enterprise services 270 that manages the host system. The encryption/decryption keys to enable secure communication between platform 200 and enterprise services 270 may be stored in flash memory 290 during manufacture of chipset 220 and manageability engine (ME) 230.

In the embodiment shown in FIG. 2, manageability engine (ME) 230 is coupled to a microcontroller 240 via a Manageability Engine Controller Interface (MECI) 231. In one embodiment, microcontroller 240 is a general-purpose controller that performs storage command decoding and other accelerated operations. In the embodiment shown, manageability engine (ME) 230 controls the behavior of microcontroller 240, which in turn controls the behavior of storage controller 250. Microcontroller 240 includes drivers for storage controller 250 as well as the logic related to any disk encryption functionality. Storage controller 250 is the controller for storage devices such as storage device 252 and enables microcontroller 240 and ME 230 to access data stored on storage device 252.

Platform 200 further includes memory devices such as dynamic random access memory (DRAM) 212, static random access memory (SRAM) 222 within chipset 220, and flash memory 290, as well as storage device 252 accessible via storage controller 250. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 252 may include mass storage devices such as integrated drive electronics (IDE) hard drives, and/or other devices or media, such as floppy disks, optical storage, tapes, flash memory, memory sticks, digital video disks, biological storage, etc.

Flash memory 290 is accessible by chipset 220 via flash interface 291. Data stored on storage device 252 and/or in memory devices DRAM 212, SRAM 222, and flash memory 290 may be encrypted.

Flash memory 290 contains firmware used to initialize platform 200. This initialization firmware includes Basic Input/Output System (BIOS) firmware 292 to identify and initialize system component hardware (such as the video display card and hard disk) and some other hardware devices including manageability engine (ME) 230. BIOS firmware 292 prepares system component hardware of platform 200 to operate in a known low capability state, so other software programs stored on various media, including an operating system, can be loaded, executed, and given control of platform 200. ME firmware 296 enables the initial configuration of manageability engine (ME) 230 during the boot process. In one embodiment, manageability engine (ME) 230 registers with ME firmware 296 to receive a notification just before an operating system is loaded for platform 200. This notification enables manageability engine (ME) 230 to perform certain instructions in preparation for the operating system being loaded.

Flash memory 290 also includes network controller firmware 295 to configure network controller 260, and chipset firmware 296 to configure chipset 220. Flash memory 290 also contains a data region 298. In one embodiment, data region 298 is encrypted and may only be read by manageability engine (ME) 230. Information used by ME 230 to provide Anti-Theft services may be stored in data region 298 of flash memory 290 or on storage device 252.

Processor 210 may also be communicatively coupled to additional components, such as video controllers, small computer system interface (SCSI) controllers, network controllers, universal serial bus (USB) controllers, input devices such as a keyboard and mouse, etc. Platform 200 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 260 for example, may be implemented as adapter cards with interfaces (e.g., a PCI connector) for communicating with a bus. In one embodimen02.3.t, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 200 may be controlled, at least in part, by input from conventional input devices, such as keyboards, mice, etc., and/or by commands received from another machine, biometric feedback, or other input sources or signals. Platform 200 may utilize one or more connections to one or more remote data processing systems (not shown), such as through a network interface controller (NIC) 160, a modem, or other communication ports or couplings.

Platform 200 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Figure 3:
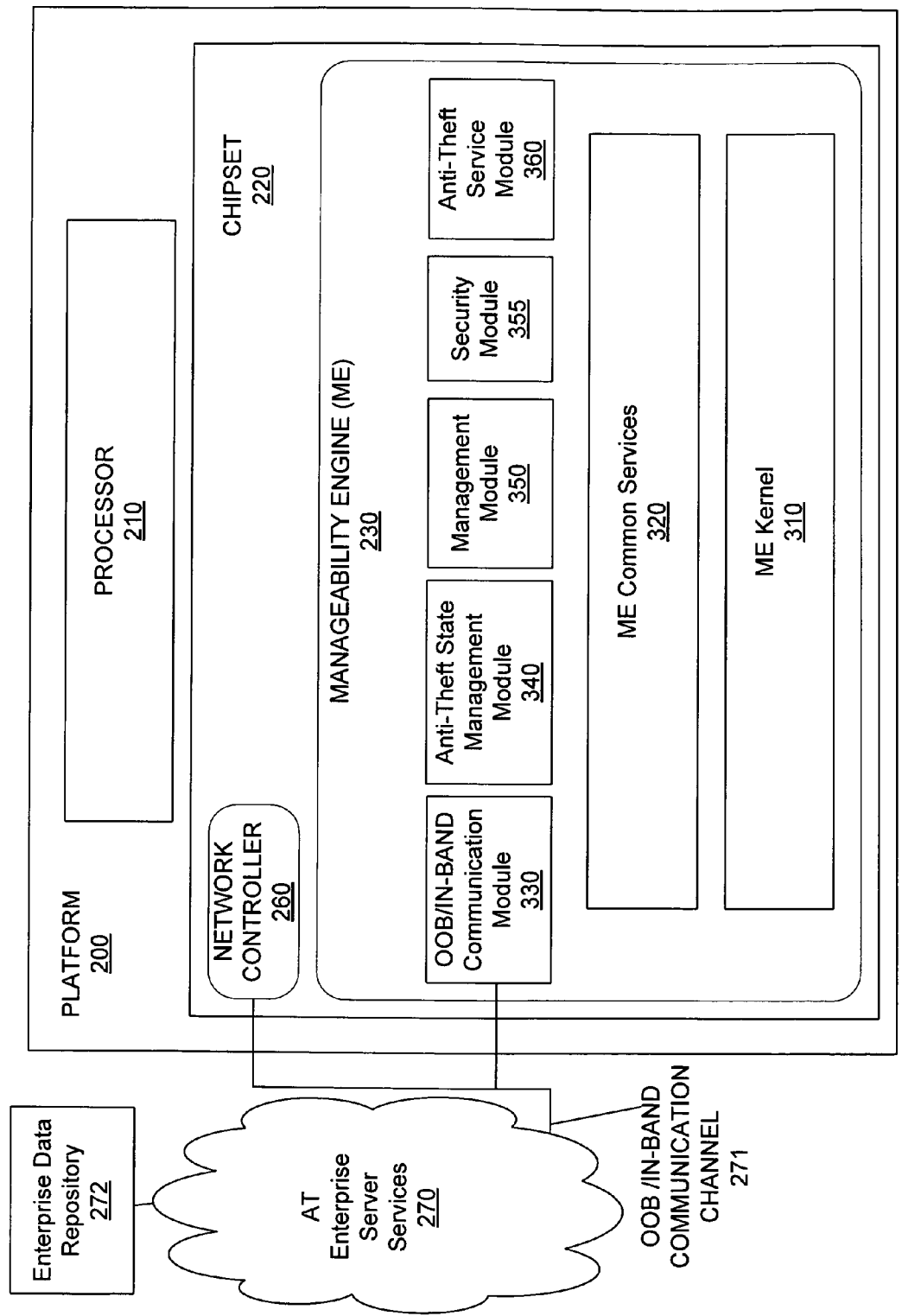
FIG. 3 shows further details of the system of FIG. 2 in enabling restoration of a platform in accordance with embodiments of the invention.

FIG. 3 shows further details of manageability engine (ME) 230 and enterprise AT services 270 of FIG. 2 in which embodiments of the invention may be implemented. ME 230 includes logic and communicates with Intel Anti-Theft firmware module and AT State management module service 370, which may be an Intel® service, of enterprise services 270 via out-of-band/in-band communication channel 271.

Within chipset 220, manageability engine 230 is shown after ME firmware 296 of FIG. 2 has been loaded. Manageability engine 230 includes ME kernel 310, which provides basic operational capabilities to manageability engine 230, and ME common services 320, which provides basic services such as network communication, security, cryptographic, and timer services. Manageability engine 230 also includes out-of-band (OOB)/in-band communication module 330. OOB communication module 330 facilitates communication between components of platform 200 with corresponding components of enterprise services 270 via network controller 260. Manageability engine 230 also includes Anti-Theft service module 360, which manages the Anti-Theft Service on the platform.

Manageability engine (ME) 230 also includes management module 350, security module 355, and an Anti-Theft Service module 360 according to embodiments of the invention. These modules are used in conjunction with AT enterprise services 270 to maintain consistency with enterprise-wide policies for configuration and management of platforms such as platform 200. OOB/In-band server communication module 330 facilitates communication between AT Service module 360, and security module 355 with corresponding components (not shown) of AT enterprise services 270 via network controller 260.

Figure 4:
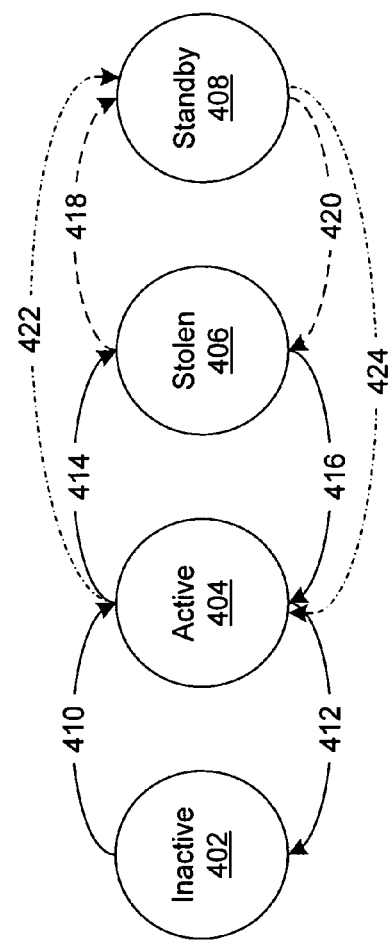
FIG. 4 is a state diagram according to embodiments of the invention.

As discussed earlier, an Anti-theft (AT) system may be activated on the platform 200 to provide asset protection, data protection, and theft-deterrence of the platform 200 using modules including the anti-theft service module 360. FIG. 4 is a state machine diagram representing various states of AT for the platform 200; including an inactive state 402, an active state 404, a stolen state 406, and a standby state 408. In one embodiment, the inactive state 402 represents the platform 200 in a pre-enrollment configuration wherein the platform 200 has either not sought permission to activate the AT with a server, such as an enterprise/AT server 502 described below in FIG. 5, or wherein the AT technology has been deactivated on the platform 200.

Continuing with this embodiment, an enrollment 410 process is used to transition the platform 200 from the inactive state 402 to the active state 404. The platform 200 can qualify for the enrollment 410 process if the platform 200 is eligible for operation with an AT system. An enrollment agent for the AT may request permission to activate the AT with an ISV server or an enterprise AT server 402. In response, the ISV server may validate the request and an AT permit (in an embodiment, is an Intel Authorized, cryptographically signed and encrypted data structure to activate Anti-Theft on the platform) may be sent to the platform 200 to allow the platform 200 to validate signed messages from the ISV server or enterprise AT server 402. While in the active state 404, a rendezvous timer may be used to determine if the platform 200 should remain in the active state 404, or if a trigger and policy execution 414 process should be implemented to change a state of the platform 200 from the active state 404 to the stolen state 406, such as through an anti-theft state management module 340 of FIG. 3.

A trigger may be used to transition a state of the platform 200 from the active state 404 to the stolen state 406. One such trigger is a stolen (or AT platform lock) message that is sent from the ISV server to the platform 200. In other embodiments, the trigger could be an Anti-Theft platform tamper detection by the ME firmware 296 or policy driven local login failures to login to an operating system (OS). Transitioning the platform 200 to the stolen state 406 indicates to the platform 200 that policy actions are to be implemented. As an example, when transitioned to the stolen state 406, the platform 200 may take an action to disable either immediately or over a given time period the platform 200. Further, or as an alternative, the AT mechanism or system may protect data on the platform 200 by deleting a portion of all of the data or disable access to the data.

Embodiments of the invention provide the ability to enter a repair scenario or otherwise temporarily disable or suspend the AT platform state by transitioning the platform 200 from the stolen state 406 to the standby state 408 through an authentication 418 process. Application of the authentication 418 process allows access to the platform 200 through the repair scenario without loss of an AT permit (in an embodiment, an Intel Authorized, cryptographically signed and encrypted data structure to activate Anti-Theft on the platform). Alternatively, the client device 102 or platform 200 may transition from the active state 404 directly to the standby state 408 using a bypass process 422. The bypass process 422 may be applied to access the standby state 408 from the active state 404 without transitioning the platform 200 to the stolen state 406. Embodiments of the authentication 418 process are described below in FIG. 6 and FIG. 7. The AT standby state 408 is time bounded and policy based in an embodiment, though the embodiment is not so limited.

The standby state 408 may allow a user to access hardware and software, based on AT policy based timer duration in the platform 200 and allow service/support engineers to repair the AT enabled platform without re-flashing/reprogramming ME Firmware 296 on the platform 200. If the platform 200 is not repaired or otherwise corrected according to policy requirement(s), a hibernation 420 process may be employed to transition the platform 200 from the standby state 408 back to the stolen state 406. For example, if a timer expires while in the standby state 408, the platform 200 may enter the hibernation 420 process to transition the platform 200 back to the stolen state 406.

A restoration 424 process according to embodiments of the invention and as described below in FIG. 6 and FIG. 7 may be used to transition the platform 200 from the standby state 408 to the active state 404. In another embodiment, a recovery 416 process may be used to transition the platform 200 from the stolen state 406 to the active state 404. The recovery 416 process may include entering a pass phrase (a user activated password provided during AT activation) in the AT system to verify a user's credentials. Alternately, the recovery 416 process may include entering a recovery token (an ISV Server generated platform recovery password) in the AT system to transition the platform 200 from the stolen state 406 to the active state 404. The platform 200 may be transitioned from the active state 404 back to the inactive state 402 by a deactivation 412 process wherein an AT system is deactivated on the platform 200.

Figure 5:
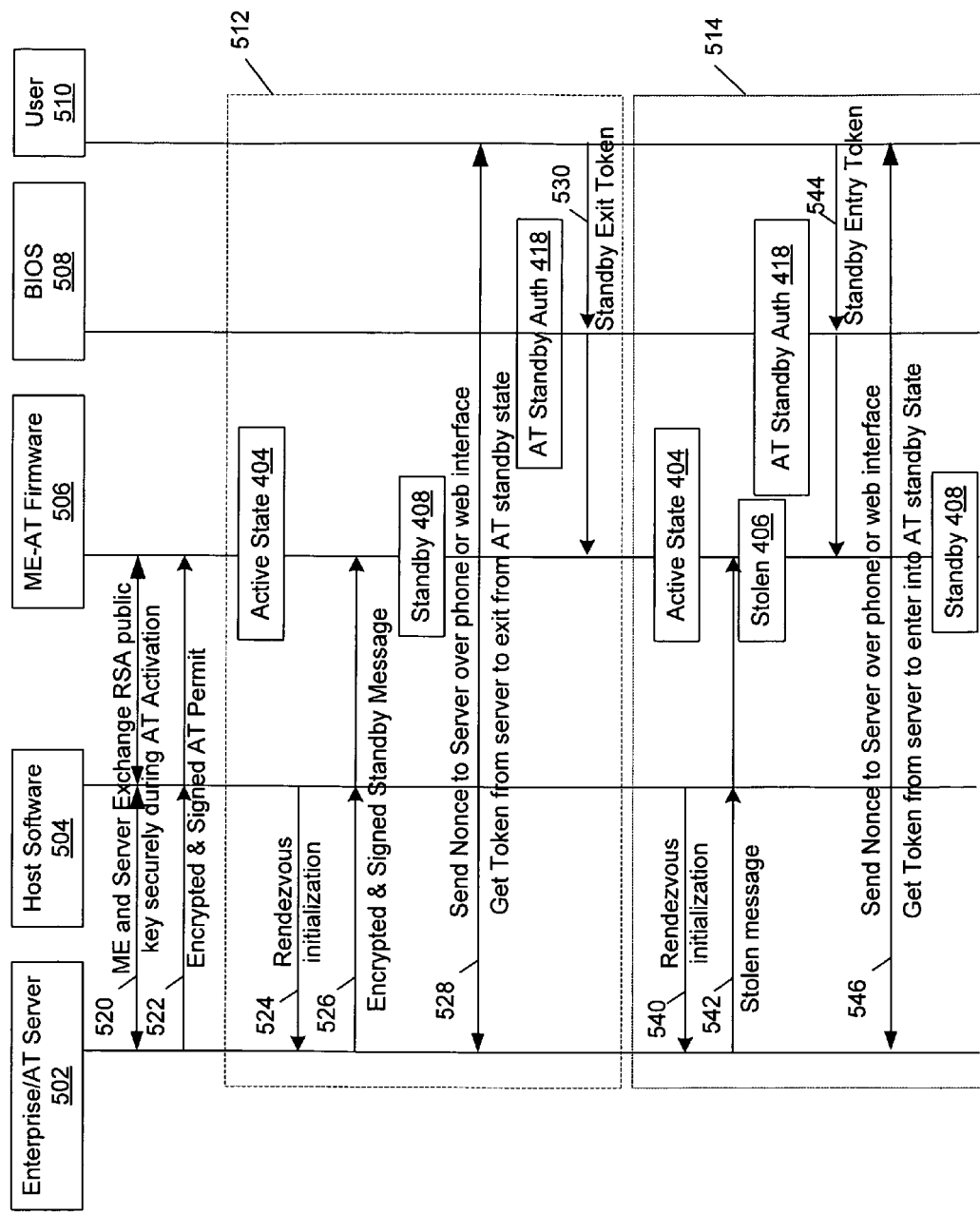
FIG. 5 is a process diagram according to embodiments of the invention.

FIG. 5 is a process diagram that describes the authentication process 418 according to embodiments of the invention. Some embodiments of the authentication process are additionally described later in FIGS. 6 and 7. A platform 200 with an activated AT system may be transitioned to the standby state 408 through an authentication 418 process using an enterprise/AT server or ISV Server 502, host software 504 on the platform 200, ME-AT firmware (FW) 506, BIOS 508 on the platform 200, and a user 510.

An RSA (Rivest, Shamir, and Adelman) key pair is generated by the ME-AT firmware 506 and RSA public keys are securely exchanged between the ME-AT firmware 506, the host software 504, and the server 502 during AT activation or enrollment 410. The RSA key pair is generated and may be stored as an encrypted data binary large object (blob). A public key or "shared secret" key may placed, programmed, or burned into the SPI flash memory by an original equipment manufacturer (OEM) of the platform 200 in a location that is readable by the manageability engine (ME). In this embodiment, the location of the public key may be restricted in a manner to only be readable by the ME. An encrypted and signed AT permit 522 is sent to the host software 504 and the ME-AT firmware 506 to place the platform 200 in the active state 404.

In a first embodiment 512, the platform 200 is in the active state 404. While in the active state 404, a rendezvous process using a rendezvous initialization 524 message is sent to the enterprise/AT server 502 on a periodic basis to refresh a theft status according to a usage policy. The rendezvous initialization 512 message may be triggered by the expiration of a rendezvous timer in the platform 200, such as by a client agent within the host software 504. An encrypted and signed standby message 526 is sent from the enterprise/AT server 502 to the host software 504 and the ME-AT firmware 506 to initiate the standby state 408. A nonce, or a secure number such as a random or pseudo-random number that is issued for authentication, is sent 528 from the user 510 to the enterprise/AT server 502 over a phone or other interface such as a web interface and a token is retrieved from the server 502 for exiting from the standby state 408. The standby exit token is sent 530 from the user 510 to the BIOS 508, then to the ME-AT firmware 506.

The platform 200 may be repaired through use of the standby 408 state, for example by allowing for resetting of a serial peripheral interface (SPI) flash memory to a desired setting or settings and/or through removal of a faulty or unauthorized activation of an AT system by either a rogue independent software vendor (ISV) or an ISV that is no longer available.

In a second embodiment 514 illustrated in FIG. 5, a platform 200 in the active state 404 sends a rendezvous initialization 540 message from the host software to the enterprise/AT server 502. A stolen message 542 is sent from the enterprise/AT server 502 to the host software 504 then to the ME-AT firmware 506 to place the platform 200 in the stolen state 406. The AT standby authentication 418 process is initiated and a standby entry token 544 is sent from the user 510 to the BIOS 508 and to the ME-AT firmware 506. A nonce is sent 546 from the user 510 to the enterprise/AT server 502 over a phone or other interface such as a web interface and a token is retrieved from the server 502 to enter into the standby state 408.

Figure 6:
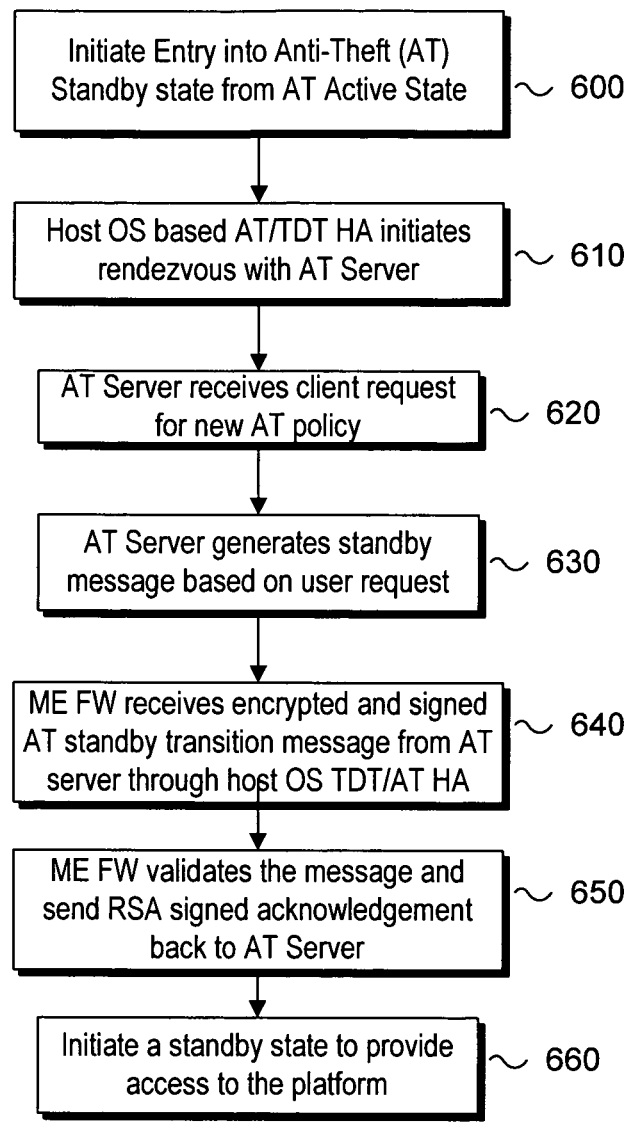
FIG. 6 is a flowchart for accessing a platform according to embodiments of the invention.

FIG. 6 is a flowchart for accessing a platform 200 from an active state 404 according to embodiments of the invention. In element 600, entry to the anti-theft (AT) standby state 408 of the platform 200 from the active state 404 is initiated. An operating system (OS) based AT system initiates rendezvous with the enterprise/AT server 502 in element 610. The enterprise/AT server 502 receives a client device 102 or platform 200 request for a new AT policy in element 620 and the enterprise/AT server 502 generates a standby message based on a user request in element 630. The ME-AT firmware (FW) 506 receives an encrypted and signed AT standby transition message (element 640) from the enterprise/AT server 502 through the host software 504. The ME-AT firmware (FW) 506 validates the signed AT standby transition message and sends an RSA signed acknowledgement to the enterprise/AT server 502 in element 640. The standby state 408 is initiated in element 660 to provide access to the platform 200.

Figure 7:
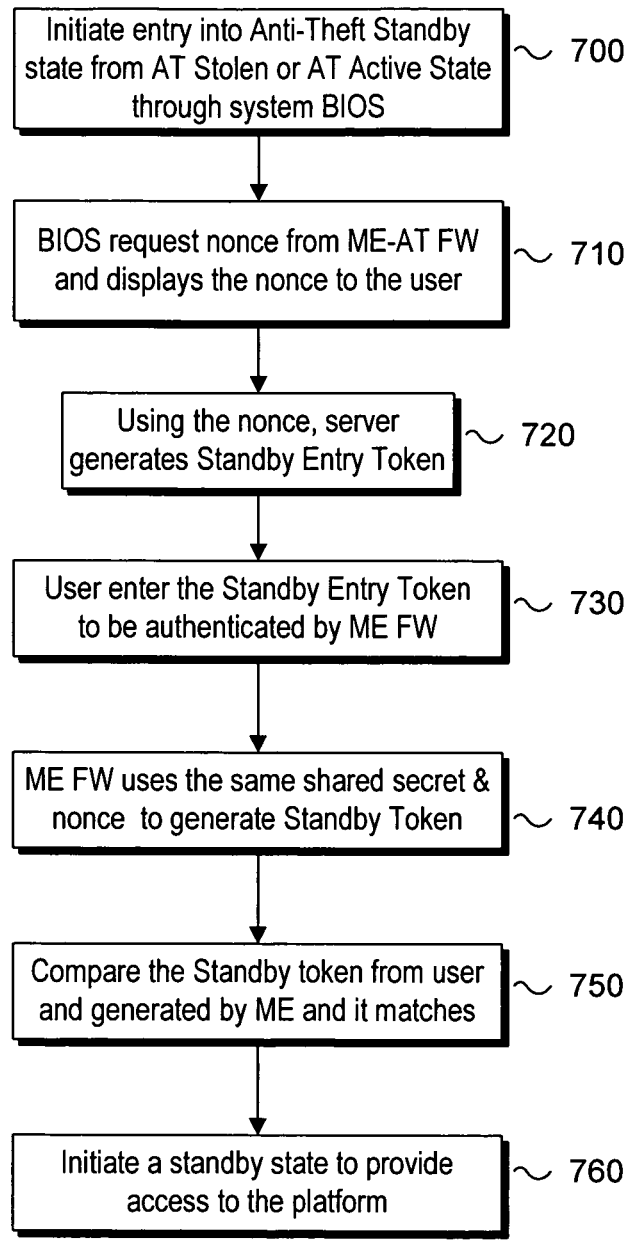
FIG. 7 is a flowchart illustrating an alternate method for accessing a platform according to embodiments of the invention.

FIG. 7 is a flowchart illustrating an alternate method for accessing a platform 200 from the active state 404 or the stolen state 406 according to embodiments of the invention. As this method illustrates, entry into the AT standby state 408 is initiated from the stolen state 406 or the active state 404 through the BIOS in element 700. A nonce is requested through the BIOS from the ME-AT firmware 506 in element 710 and the nonce is displayed to the user 510. A standby entry token is generated by the enterprise/AT server 502 in element 720 using the nonce, however additional information may also be used in the generation of the standby entry token. In this embodiment, the user 510 enters the standby entry token in element 730 for authentication by the ME-AT firmware 506. The ME-AT firmware 506 uses a public key or shared secret and the nonce to generate a standby token in element 740. The standby token from the user 510 is compared to a standby token generated by the ME-AT firmware 506 to determine whether there is a match in element 750. The standby state 408 is initiated in element 760 to provide access to the platform 200.

The operations discussed herein may be generally facilitated via execution of appropriate firmware or software embodied as code instructions on the host processor and microcontroller, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as the flash memory 290; the dynamic random access memory (DRAM) 212; a magnetic disk storage media; an optical storage media; and the static random access memory 222, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for accessing a platform with an anti-theft mechanism, comprising:
   requesting authorization to access a standby state by sending a platform public key to a server;
   receiving a server public key;
   receiving an encrypted and signed anti-theft permit;
   sending a rendezvous message to the server;
   receiving an encrypted and signed anti-theft standby transition message from the server;
   validating the anti-theft standby transition message;
   sending a cryptographically signed acknowledgment to the server;
   transitioning from an active state to a stolen state in response to a trigger indicating that the platform has been stolen, wherein the platform (i) permits access to hardware resources and software resources while in the active state and (ii) restricts access to hardware resources and software resources while in the stolen state; and
   transitioning from the stolen state to the standby state on the platform in response to validating the anti-theft standby transition message, wherein the platform permits access to the hardware resources and the software resources before expiration of a timer of the platform while in the standby state.

2. The method of claim 1, further including generating a platform cryptographic key pair and storing the platform cryptographic key pair as an encrypted data binary large object.

3. The method of claim 1, wherein the standby transition message is validated by a manageability engine.

4. The method of claim 3, wherein the platform public key and the server public key is exchanged through host software on the platform.

5. The method of claim 2, wherein the platform public key may only be readable by a manageability engine.

6. A method for accessing a platform using a manageability engine, comprising:
   requesting authorization to access a standby state by sending a platform public key to a server;
   receiving a server public key;
   receiving an encrypted and signed anti-theft permit;
   generating a nonce;
   generating a first standby token using the nonce and the platform public key;
   receiving a second standby token;
   authenticating the second standby token using the first standby token;
   transitioning from an active state to a stolen state in response to a trigger indicating that the platform has been stolen, wherein the platform (i) permits access to hardware resources and software resources while in the active state and (ii) restricts access to hardware resources and software resources while in the stolen state; and
   transitioning from the stolen state to the standby state to provide access to the platform in response to authenticating the second standby token, wherein the platform permits access to the hardware resources and the software resources before expiration of a timer of the platform while in the standby state.

7. The method of claim 6, wherein the platform public key is stored in a flash memory.

8. The method of claim 6, wherein the second standby token is authenticated by the first standby token using the manageability engine.

9. The method of claim 7, wherein the platform public key may only be readable by the manageability engine.

10. The method of claim 6, further comprising restoring the platform by resetting a serial peripheral interface flash memory to a desired setting or settings.

11. A non-transitory machine-readable storage medium that provides instructions, which when accessed, cause a machine to perform operations in a platform, comprising:
   requesting authorization to access a standby state by sending a platform public key to a server;
   receiving a server public key;
   receiving an encrypted and signed anti-theft permit; sending a rendezvous message to the server;
   receiving an encrypted and signed anti-theft standby transition message from the server;
   validating the anti-theft standby transition message;
   sending a cryptographically signed acknowledgment to the server;
   transitioning from an active state to a stolen state in response to a trigger indicating that the platform has been stolen, wherein the platform (i) permits access to hardware resources and software resources while in the active state and (ii) restricts access to hardware resources and software resources while in the stolen state; and
   transitioning from the stolen state to the standby state on the platform in response to validating the anti-theft standby transition message, wherein the platform permits access to the hardware resources and the software resources before expiration of a timer of the platform while in the standby state.

12. The non-transitory machine-readable storage medium of claim 11, wherein the platform public key is stored in a flash memory.

13. The non-transitory machine-readable storage medium of claim 11, wherein the standby transition message is validated by a manageability engine.

14. The non-transitory machine-readable storage medium of claim 11, wherein the platform public key and the server public key is exchanged through host software on the platform.

15. The non-transitory machine-readable storage medium of claim 11, further comprising restoring the platform by resetting of a serial peripheral interface flash memory to a desired setting or settings.

* * * * *